Patented July 28, 1953

2,647,101

UNITED STATES PATENT OFFICE 2,647,101

PROCESS FOR MAKING TRANSPARENT FILM FROM VINYL CHLORIDE BASED RESINS ADMIXED WITH BUTADIENE-ACRYLONITRILE TYPE COPOLYMERS

Bingham J. Humphrey, Mount Carmel, Conn., and Robert J. Reid, Canal Fulton, Ohio, assignors to The Firestone Tire & Rubber Company, Akron, Ohio, a corporation of Ohio No Drawing. Application July 2, 1947,
Serial No. 758,714

7 Claims. (Cl. 260—45.5)

This invention relates to novel, thin, transparent, flexible, and inelastically extensible packaging films cast from mixtures of vinyl chloride based resins plasticized with butadiene-acrylonitrile type copolymers.

A number of materials have been proposed for casting into thin transparent films and a few of these, such as viscose, cellulose acetate and rubber hydrochloride, have enjoyed some commercial success. All of these films, however, leave much to be desired. The cellulose films produced from viscose are relatively inextensible and must be specially coated in order to develop any degree of resistance to moisture transmission and ability to heat seal in packaging machinery. Likewise, they are sensitive to changes in humidity. The cellulose acetate cast films have been confined largely to relatively non-extensible sheetings. The rubber hydrochloride cast films have excellent pliability, extensibility and resistance to moisture vapor transmission; however they age very poorly, and also have an objectionable blush on being extended.

Accordingly it is an object of this invention to provide novel cast films having a desirable degree of transparency, clarity, strength, and inelastic extensibility adapting them for use as a wrapping material.

Another object is to prepare films of this type having a high degree of resistance to the transmission of water vapor.

A further object is to provide films of this type which are reliably heat-sealable and otherwise well adapted for use in automatic packaging machinery.

A still further object is to provide such films having a high degree of resistance to deterioration by light and oxidation.

SYNOPSIS OF THE INVENTION

The above and other objects are secured, in accordance with this invention, in films cast from a solution, in an organic solvent, of a mixture of (1) 100 parts by weight of a vinyl chloride based resin plasticized by admixture with (2) from about 20 parts to about 120 parts by weight of a copolymer of a butadiene-type compound with an acrylonitrile-type compound. Films so cast have excellent mechanical properties, being flexible, strong, inelastically extensible, and tear resistant. Particularly when they contain copolymers of butadiene-type compounds with acrylonitrile type compounds prepared in accordance with special techniques hereinafter more fully described, the films have exceptional transparency, clarity and sparkle.

The films have a large native degree of stability against deterioration by light, heat and oxidation, and of resistance to transmission of water vapor, all of which properties may be greatly enhanced by compounding as hereinafter more fully described. The films work well in automatic packaging machinery, by reason of their excellent mechanical properties above set forth, and by reason of their ability to heat-seal. The starting materials are all cheaply procurable from reliable domestic sources.

THE VINYL CHLORIDE BASED RESIN

Referring first to the vinyl chloride based resins employed in the practise of this invention, these may be any resinous polymers of vinyl chloride, or resinous copolymers thereof with minor proportions of other unsaturated compounds copolymerizable therewith. With respect to the resinous copolymers, these constitute a well-known class of materials, the essential feature of which is that the molecules thereof partake essentially of the normal polymeric chain structure of simple vinyl chloride polymers with the exception that the chains are interspersed at intervals with the vestiges of other extraneous usaturated compounds which have been drawn into the polymerization. Providing (1) that the extraneous unsaturated compounds have not entered the copolymer to the extent of more than about 20%, based on the weight of copolymer and (2) that the extraneous compounds are not of the cross-linking type, i. e., do not contain plural, independently reactive unsaturated groups capable of entering different polymeric chains, the essential character of the vinyl chloride resin is not changed by the incorporation of these extraneous unsaturated compounds, beyond a certain advantageous plasticization and increased solubility and compatibility imparted by the discontinuity of the copolymeric chain. Vinyl chloride will also tolerate, in its copolymers, up to about 2% of cross-linking comonomers without departure from the essential properties of a simple vinyl chloride polymer. Suitable non-cross-linking comonomers capable of copolymerizing with vinyl chloride are a well-known class of compounds and include for instance, vinyl esters on the order of vinyl bromide, vinyl fluoride, vinyl acetate, vinyl chloroacetate, vinyl butyrate, other higher fatty acid vinyl esters, vinyl alkyl sulfonates and the like; vinyl ethers such as vinyl ethyl ether, vinyl isopropyl ether, vinyl β-chloroethyl ether and the like; cyclic unsaturated compounds, such as styrene, the mono- and poly-chlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, arcylonitrile, methacrylonitrile, diethyl maleate, diethyl fumarate and the like; vinylidene compounds on the order of vinylidene chloride, vinylidene bromide, vinylidene fluorochloride, and the like; unsaturated hydrocarbons such as ethylene, propylene, isobutene and the like; allylic compounds such as allyl acetate, allyl chloride, allyl ethyl ether and the like; and conjugated and cross-conjugated unsaturated compounds such as butadiene, isoprene, chloroprene, 2,3-dimethyl butadiene-1,3, piperylene, divinyl ketone, divinyl sulfone, and the like. Examples of cross linking comonomers which may be included to the extent of 2% are diallyl phthalate, diallyl ether, divinyl ether, diallyl maleate and the like. For a fairly complete list of materials known to copolymerize with vinyl chloride, reference may be had to Krczil "Kurzes Handbuch Der Polymerisations-Technik II Mehrstoff-Polymerisation" Edwards Brothers, Inc. 1945, pp. 735-737 the items under "Vinylchlorid." Instead of the single unsaturated comonomers of the types above indicated, mixtures of such comonomers may enter into the copolymers, it being understood that the total quantity thereof shall be small enough (say not over 20%, based upon the weight of copolymer) that the essential character of the polyvinyl chloride chain is retained, and also provided that not over about 2% (based on the weight of copolymers) of cross-linking comonomers shall enter thereinto, in order not to impair the solubility and workability thereof.

CONSTITUTION OF THE BUTADIENE-ACRYLONITRILE-TYPE COPOLYMER

The butadiene-acrylonitrile type copolymer forming the the second principal constituent of the films of this invention may be any copolymer of a butadiene-type compound having the formula:

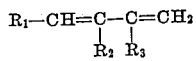

with from 10% to 55%, based on the weight of the copolymer, of an acrylonitrile-type compound of the formula:

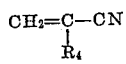

in which formulae $R_1$, $R_2$ and $R_3$, each one independently of the others, represents a hydrogen atom, a chlorine atom, an alkyl group containing from 1 to 4 carbon atoms, a methoxy group, an ethoxy group, a carbalkoxy group containing from 2 to 5 carbon atoms (including the carbonyl group), an acyloxy group derived from a lower fatty carboxylic acid containing from 2 to 5 carbon atoms, or a cyano group, with the proviso that at least one of $R_1$, $R_2$ and $R_3$ shall represent a hydrogen atom, and not more than one of $R_1$, $R_2$ and $R_3$ shall represent a cyano group; and $R_4$ represents a hydrogen atom, a chlorine atom or an alkyl radical containing from 1 to 8 carbon atoms.

Suitable butadiene-type compounds will thus be seen to include butadiene itself, isoprene, chloroprene, 2,3-dimethyl butadiene-1,3, piperylene, 2-methyl pentadiene-1,3, 1-, and 2-cyano butadienes, 2-methoxy butadiene-1,3 and the like. Suitable acrylonitrile-type compounds will be seen to include acrylonitrile itself, methyl acrylonitrile, ethyl acrylonitrile, n-propyl acrylonitrile, isopropyl acrylonitrile, chloroacrylonitrile and the like. Instead of a single unmixed butadiene compound, and a single unmixed acrylonitrile-type compound, there may be employed mixtures containing two or more butadiene-type compounds of the class above indicated as being suitable and/or containing two or more acrylonitrile-type compounds of the type above indicated. The copolymer may likewise have copolymerized therein small amounts of extraneous unsaturated copolymerizable monomeric compounds, such as vinyl chloride and the compounds copolymerizable therewith as elaborated hereinabove (with the logical exception of butadiene-type compounds and acrylonitrile-type compounds).

In general, the essential character of the copolymers of butadiene-type compounds with acrylonitrile-type compounds employed in this invention will not be altered by the further inclusion of as much as 10%, based on the weight of copolymer, of a non-cross-linking comonomer. The copolymer will likewise (surprisingly, since the material must ultimately be cast from solution) tolerate the incorporation of as much as 2% of cross-linking unsaturated comonomers, and in fact such addition frequently improves the drying properties of the copolymer.

ELABORATION OF THE BUTADIENE-ACRYLONITRILE-TYPE COPOLYMER INTO SOLVENT SOLUTION

The mode of preparation of the copolymers of butadiene-type compounds and acrylonitrile-type compounds greatly affect their performance in the films of this invention. As commercially prepared, such copolymers contain numerous gel particles, which are probably hyper-polymerized nuclei and cross-linked areas. Such gel particles appear as undesirable discontinuities in any film containing the same. The applicants patentees have found that these gel particles are formed during the hot air drying to which commercial butadiene-acrylonitrile-type copolymers are subjected after coagulation from the latex in which they are formed. The applicants patentees have found that, if the copolymers are manufactured and introduced into the film casting solutions without subjecting the copolymers to hot air drying, the films cast from the resultant solutions will be substantially free from gel particles. The applicants patentees and their coworkers have devised a number of means to this end:

I. Coagulating a latex in which the copolymer was formed, mechanically dewatering, and redissolving in an organic solvent capable of taking up small quantities of water.

II. Agitating, with on organic solvent, a latex in which the copolymer was formed so as to transfer the copolymer to the solvent phase, and separating the solvent phase by centrifugation.

III. Diluting a latex with a large volume of an organic solvent capable of dissolving large quantities of water.

IV. Preparing the copolymer by solution-polymerization in a solvent which will be incorporated directly into the final casting solution.

V. Vacuum drying.

These methods will now be discussed individually.

I. COAGULATION AND REDISSOLUTION OF WET COAGULUM

In this method, the latex in which the butadiene-acrylonitrile-type copolymer was originally polymerized is first coagulated by any suitable means, which means are not critical, inasmuch as it is merely required to accomplish the unit operation of throwing the latex out of emulsion into a coagulated form from which the bulk of the aqueous medium may be mechanically separated. Known means, and means which the applicants have employed for this purpose include, for instance the addition, to the latex, of electrolytes such as potassium aluminum sulfate, aluminum sulfate, sodium chloride, acids (in the case of anionic emulsifier stabilized latices), bases (in the case of cationic emulsifier stabilized latices) and the like; addition of water soluble organic solvents such as methanol, ethanol, glycol, glycerin, methyl ethyl ketone, acetone and the like, which have the advantage, over the electrolyte coagulants, of not introducing salts, emulsifying agent residues, etc. into the curd; electrophoresis; freezing; subjection to ultrasonic vibration; and, in the case of latices prepared with a minimum of emulsifying agents, extremely vigorous agitation. After the coagulation step, the curd is mechanically separated from the bulk of the serum by any appropriate dewatering means, as by filtration, centrifugation, pressing, passage through a straining screw press, etc. The dewatered curd is preferably washed, as by re-slurrying the water and redewatering, in order to remove vestiges of emulsifying agents, catalysts, etc. which may have been carried over from the polymerization step. The final dewatering may very conveniently be performed on a roll mill, preferably one provided with a fluted roll, such as a washing mill. The water content of the curd should be reduced as far as may be convenient in view of the circumstances under which the process is practised, for instance to about 60% or even better, to below about 30% based on the total weight of curd and entrained water, before the step or dissolving the wet curd in the water-dissolving organic solvent is attempted.

*Dissolving the curd*

The dissolving of the wet curd may be effected in any organic solvent which is capable (1) of dissolving minor proportions of water (by way of illustration, about 10% based on the total weight of water and of solvent) and (2) of forming a satisfactory cement of the butadiene-acrylonitrile-type elastomer. Suitable solvents will therefore be seen to include, for instance, ketone solvents on the order of acetone, methyl ethyl ketone and methyl isopropyl ketone; ester solvents on the order of ethyl acetate, butyl acetate, methyl butyrate, butyl formate and the like; dioxane, dioxolane and similar miscellaneous solvents; and mixtures of the various solvents above indicated as being suitable. Solvents for the elastomer which are incapable of dissolving water, such as the chlorinated hydrocarbons, and non-solvent diluents, such as the aromatic solvents, may be used in admixture with the water-miscible solvents, particularly if such non-water-dissolving solvents and diluents are not added until after the initial stages of the solution of the elastomer.

The physical operation of dissolving the elastomer curd in the solvent consists of vigorously agitating the wet curd and solvent together, preferably with at least local concentrated shearing action. Preferably, the solvent is added portionwise to insure maximum viscosity and shear in the dissolved phase, and to avoid lumping. Suitable apparatus for carrying out this portion of the process include (for small scale preparations) the Waring blendor; the Werner-Pfleiderer mixer; the Baker-Perkins mixer; the common turbo-mixer; and any other apparatus capable of vigorously agitating the mass, preferably with at least local powerful shearing action. As noted above, the solvent employed in the initial stages of the dissolving step should consist largely of a water-dissolving, true solvent for the elastomer; however, after the initial formation of the dough or cement, the solvent may be diluted to a considerable extent with non-water-dissolving solvents and mere diluents.

It should be noted at this point that the unit operation of dissolving the wet butadiene-acrylonitrile-type elastomer curd in accordance with this invention may be effected with comparative ease and with a minimum expenditure of time and power. This is in distinct contrast to the behavior of commercial dried elastomers, which require powerful and long continued mixing to effect solution.

Cements prepared in accordance with this invention will ordinarily contain small percentages of water carried over by entrainment with the wet curd, which small percentages will be unobjectionable in most cases. Removal of this water for special applications may be accomplished by distilling the water out, the solvent removed during the distillation being made up, if necessary, by introduction of additional solvents. Cements dehydrated in this way will tolerate very much larger quantities of non-water-dissolving solvents than cements containing the water introduced via the wet curd.

II. AGITATION WITH SOLVENT

This is an extractive procedure wherein the latex in which the polymerization originally took place is agitated with an organic solvent composition which is insoluble, or only sparingly soluble, in water. The copolymer and solvent phases unite, usually forming a moderately stable emulsion. Thereafter emulsion is broken, and the water and copolymer-solvent phases are separated by centrifugation, the latter phase being used as a constituent of the film-casting cement. If desired, the water in the copolymer-solvent phase may be removed by distillation.

A wide variety of organic solvent compositions may be employed, the chief criteria being (1) that the composition shall form a phase separate from water, (2) that the compositions shall be capable of dissolving the butadiene-acrylonitrile copolymer and (3) that the compositions, in the amount in which they are employed, shall not interfere with the compatibility of the vinyl resin in the final film casting cement. Inasmuch as many of the most suitable solvents will be largely soluble in water, these latter should have admixed therewith at least small proportions of hydrophobic solvents such as hydrocarbons, to inhibit the transfer of solvent to the aqueous phase. Suitable solvents will thus be seen to include methyl ethyl ketone, acetone, butyl acetate, dioxane, dioxolane, nitromethane, nitroethane, 2-nitro propane, ethylene dichloride, and the like, and mixtures of these materials with each other and with diluents such as benzene, toluene and the like.

III. Diluting Latex With Solvent

A number of excellent solvents for butadiene-acrylonitrile-type copolymers are capable of dissolving relatively large quantities of water. Examples of such solvents are acetone, methyl ethyl ketone, cyclohexanone, glycol diacetate, methyl formate and the like. The applicants patentees have found that, by adding, to a latex of a butadiene-acrylonitrile-type copolymer, a quantity of such solvents (a) sufficient to dissolve all the water and (b) sufficient to convert the mass to a single phase (at least about twice the volume of solvent as of water) there may be obtained cements which may be incorporated with vinyl chloride resins and employed for the casting of films according to this invention. The solvent should be capable of dissolving at least about 10% of the water, in order to avoid the necessity for employing large volumes of solvents. Likewise, to the same end, there should be employed latices which are as concentrated as possible, i. e., containing 50% or more solids, although latices of the usual commercial concentrations may be employed. The water in the final cement may be removed by distillation.

IV. Solution Polymerization

If by known means (as, however, is not commercially done) the butadiene-acrylonitrile-type copolymer is prepared by solution copolymerization in a solvent capable of dissolving the copolymer, there results directly a cement which may be incorporated with vinyl chloride resins to form a casting cement for the formation of films according to this invention. Preferred solvents for this type of polymerization are ethylene dichloride, chloroform, nitromethane, dioxane, methyl ethyl ketone and the like.

V. Vacuum Drying

Exposure of the butadiene-acrylonitrile-type copolymer to heat and oxidation may also be avoided by a semi-conventional process in which a conventionally produced latex is coagulated by any of the means discussed above under "I," preferably washed, and then dried at low temperature (below 60° C.) and at reduced pressure (below about 200 mm. of mercury). The resultant dried coagulum may then be dissolved in any solvent therefor irrespective of its water tolerance, and employed in the formulation of cements for casting films in accordance with this invention.

From the discussion immediately foregoing, it will be seen that cements for use in this invention may be prepared by a number of methods, the essential feature of all of which is the avoidance of subjecting the copolymer to heat-drying, i. e., conditions which will cause further polymerization or cross-linking. In general, avoidance of exposure to heat above about 60° C. for more than 30 minutes will prevent such undesirable alterations in the copolymer.

Another point to be observed in the preparation of cements of butadiene-acrylonitrile copolymers for use in this invention is the prevention of carryover of water-soluble materials into the cement, as this will result in a hazy film. Such carryover may be prevented by careful washing of the curd in methods I and V above; and careful centrifugation of the cements in methods II and III.

COPOLYMERIZATION OF THE BUTADIENE-TYPE AND ACRYLONITRILE-TYPE COMPOUNDS

Apart from their composition and mode of drying, the properties of the butadiene-acrylonitrile-type copolymers are also greatly affected by (1) the presence or absence during the polymerization reaction in which the copolymers are formed of "modifying agents" (as the term is familiarly understood in the synthetic rubber industry to refer to compounds such as alkyl mercaptans, xanthogen disulfides, and the like, the presence of which, in amounts greater than about 1%, based on the weight of monomers, appears to direct the copolymerization to the formation of straight-chain, non-cross-linked, somewhat lower molecular weight materials, see U. S. Patents Nos. 2,222,967; 2,366,328; 2,388,167; 2,391,233; 2,248,107; 2,401,346 for examples of this practise); (2) the degree to which the copolymerization is carried out before the reaction is arrested; and (3) the addition or non-addition of short-stopping agents (i. e., agents which arrest the polymerization reaction such as phenyl-$\beta$-naphthylamine) at the close of the polymerization period. For the production of rubbery copolymers suitable for the ordinary uses of butadiene-acrylonitrile-type elastomers, modification, early arrest of the polymerization, and shortstopping must all be, and conveniently are, practised. For the practise of this invention, the polymer may be prepared with or without modification (it is to be understood that the inclusion of small amounts, i. e., less than about .9%, of agents ordinarily used for modification is not to be considered modification; such small amounts appear to expedite the action of the polymerization catalysts but do not exert any great influence on the copolymer); surprisingly, from the standpoint of smooth drying during the manufacture of the film, unmodified copolymers are somewhat preferred, although they yield somewhat less plastic films, other things being equal. In general for purposes of ease of formation of cements it will be somewhat preferred to carry the copolymerization to a higher than usual degree, say to above about 70%. Of great advantage, however, is the omission of the short-stopping agents, and merely permitting the polymerization to "coast" to a stop by blowing off excess monomers and cooling to room temperatures. The resultant copolymers are more readily soluble in the formation of cements, and the cements containing vinyl resins are characterized by improved drying performance, compared with conventional butadiene-acrylonitrile-type elastomers. These differences may be tabulated as follows:

Table I

| | Conventional Copolymer | Non-shortstopped, Non-Modified Copolymer |
|---|---|---|
| Properties of the copolymer: | | |
| Coagulum | Coarse, rubbery, tacky | Fine, crumbly. |
| Methyl Ethyl Ketone Solution | Clear | Nacreous. |
| Film cast from Methyl Ethyl Ketone Solution | do | Livery, synereses during drying. |
| Properties of solutions containing copolymers and vinyl chloride based resin: | | |
| Drying time | Slow | Rapid. |
| Film cast from solution | Fairly clear | Sparkling. |
| Moisture transmission resistance of film | Fair | Excellent. |
| Tolerance of moistureproofing ingredients in film | do | Do. |

Another technique which may advantageously be employed is the use of latices of butadiene-acrylonitrile-type copolymers containing very low proportions of emulsifying agents, or no emulsifying agents at all. Such latices may be produced by known means, and films produced therefrom in accordance with the invention are characterized by enhanced electrical properties and superlative clarity.

FORMULATION OF THE FILM CASTING CEMENTS

As set forth above, the films of this invention may contain from about 20 to about 120 parts by weight of butadiene-acrylonitrile-type copolymer, per 100 parts by weight of vinyl chloride resin. Those films containing in the range of 40 to 80 parts of butadiene-acrylonitrile-type copolymer per 100 parts of vinyl chloride based resin will be found suitable for most purposes.

Coming next to the making up of the cements for casting films in accordance with this invention, the butadiene-acrylonitrile-type copolymer will usually be on hand in the form of a solvent solution prepared from the latex without heat-drying as exhaustively set forth hereinabove. This solution may be mixed with a separately prepared solution of a vinyl chloride based resin, or may be used to dissolve the granular vinyl chloride based resin as received from the channels of commerce. Solvents in these operations must include a substantial proportion of independent volatile solvents for butadiene-acrylonitrile-type elastomers and for vinyl chloride type resins such as ketones on the order of acetone, methyl ethyl ketone (this is a preferred solvent) methyl isobutyl ketone and the like; esters such as ethyl acetate, butyl formate, and the like, halogenated hydrocarbons such as carbon tetrachloride, trichloroethylene, dichloroethylene, ethylene dichloride, ethers and ether esters, such as diethyl ether, diethylene glycol diacetate, and the like. In addition to the independent solvents, the solvent composition may include relatively large proportions of diluents, i. e., solvents which are not capable alone of dissolving the butadiene-acrylonitrile-type copolymer and vinyl chloride resin, but which may be incorporated in solutions thereof without causing phase separation, such as hydrocarbons on the order of hexane, toluene (this material is particularly advantageous because of its cheapness, relative non-toxicity, good drying properties, ability to replace true solvents to a large extent, and favorable coaction with moistureproofing agents which may be incorporated in the films) benzene, solvent naphtha, and the like.

The casting solution cements should contain between about 5 and 40%, and preferably between about 12 and 18%, total weight of butadiene-acrylonitrile-type copolymer and of vinyl chloride resin, based on the total weight of casting solution. More concentrated solutions are too viscous for proper casting and flow, while more dilute solutions require excessive drying times and are wasteful of solvents.

While films cast from simple compositions containing butadiene-acrylonitrile-type copolymers and vinyl chloride resins have excellent native resistance to deterioration by exposure to light and oxidation, and excellent resistance to the passage therethrough of moisture vapor, both of these properties may be greatly enhanced by the incorporation into the casting cements, of conventional stabilizing agents such as phenyl salicylate, diphenyl tin diacetate, calcium stearate, cadmium stearate and the like; and of moistureproofing agents such as waxes, fatty esters and ethers, and the like.

Exceptional results have been obtained by the use of from about 1% to about 3% of tetramethyl thiuram disulfide as a stabilizer, and from about .1% to about .5% of a microcrystalline wax as a moisture vapor transmission preventive. Another stabilizer which has given excellent results is the stannous neutral salt of 1,2-dihydroxy-4-t-butyl benzene. Both this compound and the tetramethyl thiuram disulfide are non-discoloring, and preferably only non-discoloring antioxidants and stabilizers should be employed in the films of this invention. The films of this invention may also contain conventional liquid plasticizers such as dioctyl phthalate, dibutyl phthalate, tricresyl phosphate, dibutyl sebacate and the like although this is seldom necessary and is in most cases less desirable due to the fugitive nature of such plasticizers. The films may likewise contain appropriate dyes, vermin repellents and other minor auxiliary agents.

THE FILM CASTING OPERATION

The casting of films from cements in accordance with this invention may be carried out on any solvent-cement type film casting machine, such as a cylinder or belt casting machine. The cements will ordinarily be cast to a depth of from about .005″ to about .03″, yielding dried products ranging from about .0003″ to about .0025″ thick. the casting machine should provide a dwell, in the drying zone, of from about 5 to about 20 minutes, and the temperatures may range from about 50° to about 150° C. Gentle agitation of the drying atmosphere is preferred.

PROPERTIES OF THE FILMS

The unique feature of the films of this invention is their lack of dependence upon a low molecular weight plasticizer. The presence of the butadiene-acrylonitrile-copolymer serves all the purposes of the conventional plasticizers, but has the advantage of being non-fugitive—i. e., it will not volatilize away from the film, or be leached therefrom by water, alcohol or other materials with which it may come into contact, so that the film retains its flexibility and inelastic extensibility for an extended period of time.

Likewise, the properties of the films of this invention remain uniform throughout the life of the film since the plasticizer content thereof is not volatile. This is of great advantage in automatic packaging machinery. The absence of fugitive plasticizers also avoids difficulties such as varnish lifting, and effects upon odor and taste of articles packaged in the films.

Another excellent feature of the films of this invention is their high degree of natural resistance to deterioration by exposure to light and air, far exceeding that of any other films. This resistance may be even further enhanced by the addition of stabilizers, and it may be stated that it is possible, in accordance with this invention, to prepare films having a much higher degree of stability than any other extensible films heretofore produced.

The films of this invention further have a high degree of resistance to the transmission of moisture therethrough, which is of advantage in the packaging of commodities such as baked wares, dry foods, chemicals, delicate machine components, etc., which are deteriorated by loss or access of moisture. This native resistance may be greatly enhanced by the addition of microcrystalline waxes as hereinabove described and illustrated in Example III.

The films are also reliably heat sealable to themselves on conventional heat sealing mechanisms. The seals are tight and, providing an adequate lap is afforded, stronger than the body of the film.

The films likewise have excellent mechanical strength, usually on the order of from about 4000 to about 8000 pounds per square inch; are extensible to about 20–500% elongation without break; are tear resistant; and retain these properties both at high and low temperatures.

It will thus be seen that the films are suitable for any of the applications for which the films of the prior art have been employed, and will perform in a superior manner in such applications. These superior properties also extend the usage of these films to fields hitherto untouched by conventional films. In view of their clarity, moisture resistance and non-taste-imparting characteristic, the films of this invention are admirably adapted for the packaging of foodstuffs in general, such as butter, margarine, meats, breakfast foods, grain, legumes and the like, and in particular of foods which are deteriorated by loss or access of moisture, such as dried and dehydrated foods, frozen foods, baked wares, fruits, vegetables and the like. The films are also suitable for packaging of other commodities such as hardware items, delicate machines and machine components (particularly in sealed dehydrated envelopes familiarly known as "Type II" packages) chemicals, particularly such as are subject to caking, deliquescence, or efflorescence and the like. The packages withstand protracted and severe conditions of storage, shipment and exposure for sale.

In the following examples, all parts given are by weight.

EXAMPLE I

Preparation of elastomer:

| | Parts |
|---|---|
| Butadiene | 55 |
| Acrylonitrile | 45 |
| Dodecyl mercaptan | 0.5 |
| Sodium oleate | 5 |
| Potassium persulfate | 0.9 |
| Water | 210 |

It will be noted that the dodecyl mercaptan in the above recipe is insufficient to serve as a "modifying agent" essential to the production of a rubbery product suitable for ordinary purposes. It will also be noted that no short-stop agent is employed.

The sodium oleate, dodecyl mercaptan and potassium persulfate were dissolved in the water, and the solution introduced into a closed polymerizer provided with a rotary agitator. The butadiene and acrylonitrile were then introduced, and the temperature adjusted to 36° C. Agitation and polymerization were carried on for 10 hours, at the end of which time the unreacted monomers were simply blown off and swept out of the polymerization mass with steam. No short-stopping agent or other material calculated to arrest the polymerization or stabilize the polymer was added. The resultant latex contained dispersed therein approximately 28% of copolymer, based on the weight of latex. This copolymer differed sharply from conventional copolymers in the respects set forth hereinabove in Table I. The latex was set aside for the manufacture of films, as will now be described.

Manufacture of films:

A { Vinyl chloride resin (copolymer of approximately 90% vinyl chloride with 10% vinylidene chloride).    84, 63, 56 or 50 parts (per Table II).
    Methyl ethyl ketone (1st portion).. 333 parts.
    Methyl ethyl ketone (2d portion).. 195 parts.
B { Butadiene-acrylonitrile copolymer latex (prepared as described immediately hereinabove).    56, 134, 157 or 178 parts (per Table II).
    Xylene 139 parts.

A series of films was made up in accordance with the foregoing schedule, using the quantities of vinyl chloride resin and of latex tabulated together in Table II, so as to provide in each case a total of 100 parts of butadiene-acrylonitrile-copolymer and vinyl resin, amounting to 15% by weight of the solvents.

In each case, the vinyl chloride resin and first portion of the methyl ethyl ketone were subjected to high speed mixing at 70° C. for 2 hours, yielding a smooth cement A. In the meantime the latex was coagulated by addition of a small amount of aluminum sulfate, and the coagulum was thoroughly washed with water and pressed to dewater it to a moisture content of 35%. The coagulum was then agitated and dissolved in a mixture of the second portion of the methyl ethyl ketone and the xylene, and the resultant solution B was mixed with cement A. The resultant solution was then cast to a depth of .01" on the casting belt of a film-casting machine, dried, and stripped off to yield a film .001" thick.

In each case there resulted a film which was sparklingly clear, substantially free from gel particles, transparent, flexible, strong and inelastically extensible—in general, being admirably adapted as a wrapping and packaging film. The film retained these properties over extended periods of time and under adverse conditions of exposure and use. The compositions of the several films, together with their mechanical properties, are set forth herewith in Table II, and it will be seen that the films increase in softness with increasing amounts of butadiene-acrylonitrile copolymer. The film of item No. 3 is an excellent all-around packaging film for most machine- and like wrapping. However, a softer film, such as that of item No. 4, would be more suitable for stretch-wrapping, while the film of item No. 1 would be desirable where decorative effects dependent upon the crispness of the film are sought.

Table II

| Item No. | Materials Used (parts by weight) | | Properties of the Films Obtained | | |
|---|---|---|---|---|---|
| | resin | latex | Tensile Strength (#/in.²) | Elongation at break (Percent) | Modulus at 100% Extension |
| 1 | 84 | 56 | 7,000 | 275 | 6,400 |
| 2 | 63 | 134 | 6,800 | 380 | 4,750 |
| 3 | 56 | 157 | 6,500 | 425 | 3,275 |
| 4 | 50 | 178 | 5,500 | 475 | 2,800 |

EXAMPLE II

Latex Extraction:                                      Parts
A { Methyl ethyl ketone (1st part) .................... 69
    Xylene ............................................. 4.5
    Butadiene-acrylonitrile copolymer latex (prepared as
      described in Example I) .......................... 36
B { Vinyl chloride resin (copolymer of 85% vinyl chloride,
      15% vinyl acetate) ............................... 12.5
    Methyl ethyl ketone (2d part) ...................... 35
    Xylene ............................................. 19

The ingredients listed at A were mixed together in a kettle with strong agitation for 15 minutes. The resultant emulsion was broken by passage through a tube-type centrifugal separator providing an acceleration of 13,000 times gravity over a clearance of ½". The light phase comprised a clear cement A of the butadiene-acrylonitrile having the composition:

Percent
Methyl ethyl ketone ................................. 77.0
Xylene .............................................. 5.2
Copolymer ........................................... 12.5
Water ............................................... 5.2

The ingredients listed at B were then agitated together at 70° C. for 2 hours, yielding a clear cement which was then blended with the cement A. The combined cement was then cast on a film casting machine to yield a film substantially identical with that of item 3 of Table II.

EXAMPLE III

Stabilization and Moistureproofing:                    Parts
C { Tetramethyl thiuram disulfide ...................... 2
    Microcrystalline paraffin wax ..................... 0.4

A film was prepared by the identical method by which the film of Table II, item 3 was prepared, with the exception that the ingredients listed hereinabove at C were dissolved in the cement prior to casting. The cast film was sparkling clear, and had all the other desirable properties characterizing the film of Table II item 3.

The moisture transmission of the film was tested as follows: A cylindrical glass cup 1½" high x 2" in diameter was provided for the test, 15 ml. of water was placed in the cup, and the film was stretched across the mouth of the cup and cemented to the lips thereof with collodion cement. The assembly was weighed, placed in a desiccator containing fused calcium chloride, and kept at 25° C. for 18 hours. The assembly was then reweighed, and the loss of moisture found to be 1 milligram. By way of comparison, a commercial rubber hydrochloride film, heretofore regarded as having the best attainable moisture transmission resistance, showed a loss of 3 milligrams in the same test.

In order to demonstrate the resistance of the films to light and oxidation, samples of the film were placed at the bottom of an open-top drum two feet high by two feet in diameter and provided with ventilating holes near the bottom. A General Electric sun lamp, using the General Electric "S-1" bulb was set up to project downward into the drum, the distance of the lamp from the bottom of the drum being adjusted to seven inches. The drum was slowly rotated about its axis to insure even exposure of the samples. Samples of the film were taken before the test and at the end of forty-five hours, seventy hours, one hundred twenty hours, one hundred seventy hours and two hundred ninety hours, of exposure, and the tensile strength and elongation at break determined. The results are tabulated herewith:

Table III

| | Duration of Exposure (hrs.) | | | | | |
|---|---|---|---|---|---|---|
| | 0 | 45 | 70 | 120 | 170 | 290 |
| Tensile Strength (#/in.) | 6,600 | 4,500 | 4,800 | 4,800 | 5,600 | 6,500 |
| Elongation at break (percent) | 560 | 400 | 375 | 250 | 240 | 33 |

By way of comparison, a commercial rubber hydrochloride film was too brittle for test after only twelve hours' exposure to the same test conditions.

EXAMPLE IV

Glycerol precipitation:
A { Butadiene-acrylonitrile copolymer latex (commercial latex containing 35% of a copolymer of 45% acrylonitrile,
      55% butadiene) ................................ ml__ 160
    Glycerin ........................................ ml__ 320
Vinyl chloride resin (copolymer of 87% vinyl chloride, 13%
  vinyl acetate) ..................................... g__ 20
Methyl ethyl ketone:
  First part ........................................ ml__ 220
  Second part ....................................... ml__ 100

The latex employed in this experiment was a commercial material polymerized in the presence of about 1.0% of lauryl mercaptan (based on monomers) as a modifier, and polymerization arrested at 75% conversion by addition of phenyl-β-naphthylamine.

The latex was poured into the glycerin. Upon standing, a curd separated, was removed by hand, and washed in hot water. The curd was then wrung out by hand, and 13 grams thereof dissolved in a high speed mixer in the first portion of the methyl ethyl ketone, and mixed for 5 minutes at high speed. With continued high speed mixing, there was then added the first portion of the vinyl chloride resin, and then the second portion of the methyl ethyl ketone. At the end of 5 minutes, the high speed mixing was discontinued, and the resultant cement allowed to stand for 30 minutes to remove bubbles. The resultant cement was then cast upon a glass plate to a depth of .015", dried on the plate in open air for 3 hours, followed by one hour in a forced draft oven at 60° C., after which the film was stripped from the plate and dried overnight in the open air. The dried film was about .001" thick and free from cloud and gel particles.

EXAMPLE V

Sodium chloride precipitation:
A { Butadiene-acrylonitrile copolymer latex (as in Example
      IV) ........................................... ml__ 100
    Aqueous sodium chloride solution (10% sodium chloride) ............................................. ml__ 200
Vinyl chloride resin (copolymer of 87% vinyl chloride, 13%
  vinyl acetate) ..................................... g__ 20
Methyl ethyl ketone:
  First part ........................................ ml__ 220
  Second part ....................................... ml__ 100

The latex was poured with stirring into the sodium chloride solution, and the resultant coagulum filtered off on a Buechner filter, and washed on the filter with water. The crumb was then wrung out by hand, and 13 grams of the wet material combined with the vinyl chloride resin and methyl ethyl ketone, and cast into a film, substantially as described in Example IV. An excellent, clear, gel particle- and haze-free film resulted.

Generally similar results were obtained with copolymer crumbs obtained from coagulating commercial butadiene-acrylonitrile latices by freezing, by addition of hydrochloric acid, and by repeated passage through a colloid mill imparting high rates of shear across small clearances. Eminently satisfactory films were obtained in each case.

EXAMPLE VI

Films were prepared similar to the film of Table II item 3, with the exception that there was employed, in place of the vinyl chloride-vinylidene chloride copolymer, (a) a copolymer of 80% vinyl chloride with 20% diethyl maleate, and (b) a copolymer of 85% vinyl chloride with 15% vinyl acetate. The resultant films had tensile strengths of (a) 5800 (#/in.$^2$) and (b) 6200 (#/in.$^2$) respectively and elongations at break of (a) 500% and (b) 550% respectively.

EXAMPLE VII

A film was prepared similar to the film of Table II item 3, with the exception that methacrylonitrile was employed in place of the acrylonitrile in the preparation of the butadiene copolymer. The resultant film had a tensile strength of 5000 (#/in.$^2$) and an elongation of 500% at break.

From the foregoing general discussion and detailed formal examples, it will be evident that this invention provides novel packaging and like films of excellent mechanical and optical characteristics. The properties of these films may be minutely adjusted, for particular applications, by manipulation of a number of variable factors such as the selection and proportions of the butadiene-type and acrylonitrile type compounds, of the selection amongst the several vinyl chloride polymers and copolymers, and the ratio in which these materials are incorporated in the films. The films are dependent, for starting materials, upon the domestically-produced, and readily and cheaply available butadiene - acrylonitrile - type copolymers and vinyl chloride resins.

This application is a continuation-in-part of the application of Humphrey and Reid, Ser. No. 497,560, filed August 5, 1943.

What is claimed is:

1. Process which comprises coagulating, from the latex in which it was polymerized, (A) from about 20 parts to about 120 parts of a copolymer of butadiene with from about 15% to about 75% of acrylonitrile, dissolving the wet coagulum in an organic solvent capable of dissolving at least small proportions of water, incorporating in the solvent (B) 100 parts of a resin selected from the group consisting of polymers of vinyl chloride and copolymers thereof with up to 20%, based on the weight of such copolymers, of other unsaturated compounds copolymerizable therewith and up to 2% of cross-linking comonomers copolymerizable therewith, casting, upon a support, a film from the resulting solution, and stripping said film from said support.

2. Process which comprises coagulating, from the latex in which it was polymerized, no short-stopping agent having been added to arrest the polymerization, (A) from about 20 parts to about 120 parts of a copolymer of butadiene with from about 15% to about 75% of acrylonitrile, dissolving the wet coagulum in an organic solvent capable of dissolving at least small proportions of water, incorporating in the solvent (B) 100 parts of a resin selected from the group consisting of polymers of vinyl chloride and copolymers thereof with up to 20%, based on the weight of such copolymers, of other unsaturated compounds copolymerizable therewith and up to 2% of cross-linking comonomers copolymerizable therewith, casting, upon a support, a film from the resulting solution, and stripping said film from said support.

3. Process which comprises coagulating, from the latex in which it was polymerized, no short-stopping agent having been added to arrest the polymerization, (A) from about 20 to about 120 parts of a copolymer of butadiene with from about 15% to about 75% of acrylonitrile, dissolving the wet coagulum in an organic solvent capable of dissolving at least small proportions of water, incorporating in the solvent (B) 100 parts of a copolymer of vinyl chloride with 10%, based on the weight of copolymer, of vinylidene chloride, casting, upon a support, a film from the resultant solution, drying the film upon said support, and stripping the film from the support.

4. Process which comprises coagulating, from the latex in which it was polymerized, no short-stopping agent having been added to arrest the polymerization, (A) from about 20 to about 120 parts of a copolymer of butadiene with from about 15% to about 75% of acrylonitrile, dissolving the wet coagulum in an organic solvent capable of dissolving at least small proportions of water, incorporating in the solvent (B) 100 parts of a copolymer of vinyl chloride with 13%, based on the weight of copolymer, of vinyl acetate, casting, upon a support, a film from the resultant solution, drying the film upon said support, and stripping the film from the support.

5. Process which comprises coagulating, from the latex in which it was polymerized, no short-stopping agent having been added to arrest the polymerization, (A) from about 20 to about 120 parts of a copolymer of butadiene with from about 15% to about 75% of methacrylonitrile, dissolving the wet coagulum in an organic solvent capable of dissolving at least small proportions of water, incorporating in the solvent (B) 100 parts of a copolymer of vinyl chloride with 20%, based on the weight of copolymer, of diethyl maleate, casting, upon a support, a film from the resultant solution, drying the film upon said support, and stripping the film from the support.

6. Process which comprises supplying (A) a polymerization-produced latex of a copolymer of (1) a butadiene-type compound selected from the group consisting of butadiene, isoprene, 2-methyl pentadiene-1,3, and mixtures of these compounds with (2) from about 15% to about 75%, based on the weight of the copolymer, of an acrylonitrile-type compound selected from the group consisting of acrylonitrile, methyl acrylonitrile, and mixtures of these compounds, substantially dewatering said latex without the application of heat, dissolving the copolymer in an organic solvent therefor to form a true solution thereof, incorporating in said solvent, for 20 to 120 parts of the copolymer, (B) 100 parts of a resin selected from the group consisting of polymers of vinyl chloride and copolymers thereof with up to 20%, based on the weight of such copolymers, of non-cross-linking unsaturated compounds copolymerizable therewith, casting, upon a support, a film from the resulting solution, drying said film, and stripping said film from said support.

7. The process of claim 6 wherein the organic solvent is added to the latex in an amount sufficient to produce a solvent phase and to dissolve the copolymer content of the latex to produce a true solution of the copolymer, and wherein the water phase is thereafter removed from the solvent phase to leave the latter as a true solution of the copolymer, into which solution the resin is incorporated and from which solution a film is cast, dried and stripped as set forth in claim 6.

BINGHAM J. HUMPHREY.
ROBERT J. REID.

References Cited in the file of this patent

UNITED STATES PATENTS

| Number | Name | Date |
|---|---|---|
| 1,966,856 | Groff | July 17, 1934 |
| 1,989,246 | Reed | Jan. 29, 1935 |
| 2,020,642 | Hagedorn | Nov. 12, 1935 |
| 2,185,656 | Waterman | Jan. 2, 1940 |
| 2,323,562 | Nugent | July 6, 1943 |
| 2,325,984 | Sarbach | Aug. 3, 1943 |
| 2,330,353 | Henderson | Sept. 28, 1943 |
| 2,514,222 | Reid | July 4, 1950 |

FOREIGN PATENTS

| Number | Country | Date |
|---|---|---|
| 586,447 | Great Britain | Mar. 19, 1947 |

OTHER REFERENCES

Sarbach: p. 367, "India Rubber World," July 1943.

Rubber Age, p. 67, April 1944.